(12) United States Patent
Kury et al.

(10) Patent No.: US 10,436,657 B2
(45) Date of Patent: Oct. 8, 2019

(54) METHOD FOR DETERMINING AN AXIAL TENSILE FORCE APPLIED TO A COMPONENT

(71) Applicant: Siemens Aktiengesellschaft, Munich (DE)

(72) Inventors: Peter Kury, Werder (DE); Dirk Hänsel, Essen (DE)

(73) Assignee: Nord-Lock Switzerland GmbH, St. Gallenkappel (CH)

( * ) Notice: Subject to any disclaimer, the term of this patent is extended or adjusted under 35 U.S.C. 154(b) by 126 days.

(21) Appl. No.: 15/571,563

(22) PCT Filed: Mar. 4, 2016

(86) PCT No.: PCT/EP2016/054633
§ 371 (c)(1),
(2) Date: Nov. 3, 2017

(87) PCT Pub. No.: WO2016/180554
PCT Pub. Date: Nov. 17, 2016

(65) Prior Publication Data
US 2018/0149534 A1  May 31, 2018

(30) Foreign Application Priority Data
May 11, 2015  (EP) .................................... 15167181

(51) Int. Cl.
*G01L 5/12* (2006.01)
*F16B 31/02* (2006.01)
(52) U.S. Cl.
CPC ................ *G01L 5/12* (2013.01); *F16B 31/02* (2013.01)
(58) Field of Classification Search
CPC ..................................... G01L 5/12; F16B 31/02
See application file for complete search history.

(56) References Cited

U.S. PATENT DOCUMENTS

| 4,246,780 A | 1/1981 | Reed |
| 5,142,906 A | 9/1992 | Smith |
| (Continued) | | |

FOREIGN PATENT DOCUMENTS

| DE | 10206679 C1 | 8/2003 |
| DE | 69937246 T2 | 7/2008 |
| (Continued) | | |

OTHER PUBLICATIONS

International Search Report dated Jun. 14, 2016 for PCT/EP20161054633.

(Continued)

*Primary Examiner* — Justin Seo
*Assistant Examiner* — John M Royston
(74) *Attorney, Agent, or Firm* — Beusse Wolter Sanks & Maire (57) ABSTRACT

A method for determining an axial tensile force applied to a component, includes fastening the component in place and applying axial tensile force to the component from a free end of the component by a loading device, having a loading body with a central axial main threaded bore and a plurality of secondary threaded bores distributed evenly along the circumference and having loading screws, which are screwed into the secondary threaded bores. The loading body is screwed onto the free end of the component and the loading screws are loaded against a stationary abutment in the direction of the fastening. The axial tensile force applied to the component is determined. Deformation of the loading body transverse to the axial direction of the loading body is sensed and the axial tensile force applied to the component is determined from the deformation of the loading body.

14 Claims, 4 Drawing Sheets

(56) References Cited

U.S. PATENT DOCUMENTS

| | | | |
|---|---|---|---|
| 5,154,084 A | 10/1992 | Sonderegger et al. | |
| 6,263,764 B1 | 7/2001 | Steinbock | |
| 2011/0184666 A1* | 7/2011 | Imai | G01L 5/24 |
| | | | 702/43 |
| 2014/0338463 A1 | 11/2014 | Seaman et al. | |

FOREIGN PATENT DOCUMENTS

| | | |
|---|---|---|
| EP | 1336829 A2 | 8/2003 |
| JP | S57161526 A | 10/1982 |
| JP | S57171550 U | 10/1982 |
| JP | H02160199 A | 6/1990 |
| JP | H04228299 A | 8/1992 |
| JP | H04273032 A | 9/1992 |
| JP | H05501765 A | 4/1993 |
| JP | 3128065 U | 12/2006 |
| WO | 9964201 A1 | 12/1999 |
| WO | 2015034712 A1 | 3/2015 |

OTHER PUBLICATIONS

EP Search Report and Opinion dated Dec. 3, 2015, for EP patent application No. 15167181.

Lechner, Christof et al, Fachbuch "Stationäre Gasurbinen", ISBN 3-540-42831-3, pp. 629-631; Springer-Verlag Berlin Heidelberg 2003, Germany.

* cited by examiner

METHOD FOR DETERMINING AN AXIAL TENSILE FORCE APPLIED TO A COMPONENT

CROSS REFERENCE TO RELATED APPLICATIONS

This application is the US National Stage of International Application No. PCT/EP2016/054633 filed Mar. 4, 2016, and claims the benefit thereof. The International Application claims the benefit of European Application No. EP15167181 filed May 11, 2015. All of the applications are incorporated by reference herein in their entirety.

FIELD OF INVENTION

The invention relates to a method for determining an axial tensile force applied into a component, in which—the component is fixed in position and the axial tensile force is applied into the component from a free end of the component by means of a tensioning device which includes a tension body having a central axial main threaded bore and a plurality of secondary threaded bores distributed evenly along the circumference of the main threaded bore, and which includes tensioning bolts which are screwed into the secondary threaded bores, in that the tension body is screwed onto the free end of the component and the tensioning bolts are tightened against a stationary abutment in the direction of the stationary fixation, and—the axial tensile force applied into the component is determined.

BACKGROUND OF INVENTION

In diverse areas of application, there is a need for determining forces which are applied into components. The forces applied into the components in the axial direction are of particular interest primarily in the case of components in the forms of axles, shafts, or bolts.

An axial force applied into a component can be determined, for example, in that a deformation of the component in the axial direction, which is induced by the introduction of force, is detected by performing a measurement. A plurality of measuring sensors is generally used for this purpose, which sensors are spaced apart from each other in the axial direction along the component and which are utilized for measuring an axial extension and/or an axial compression of the component. There is a problem, in this case, that representative points on the components are not always accessible. Therefore, it is difficult, in part, to position a plurality of measuring sensors at different axial positions.

The object is to eliminate these disadvantages. DE 10 206 679 describes a method, for example, in which the axial force applied into an axle or shaft is determined, in that an annular measuring body, which rests via its two end faces against contact surfaces which are radially offset with respect to each other, is exposed to the axial force. The annular measuring body consequently undergoes bending deformation which is measured by means of strain gauges. The axial force is inferred from the detected deformation of the annular measuring body.

The known method has proven effective for measuring particularly low axial forces. There is also a need, however, to measure greater axial forces, for example, in the range of a few meganewtons or more.

The measurement of relatively great forces can be of interest, for example, in the case of gas turbine systems. In the case of tie-bolts, by means of which the rotor disks are clamped against each other in the axial direction, a correct tie-bolt tension should be set throughout the entire service life, primarily in order to ensure the torque transfer and the mechanical integrity of the rotor even in malfunction situations.

During the first startup of a new system, the tie-bolt tension can be achieved by means of defined hydraulic stretching using a known force and via the elastic elongation of the tie-bolt. It can be desirable to monitor the tie-bolt tension over the course of the service life of the gas turbine.

Specifically, the tie-bolt, onto which the rotor disks of the gas turbine are slid, is fixed in position at its one end and an axial tensile force is applied into the tie-bolt from the free end of the tie-bolt, in that, for example, a classical nut is screwed onto a male thread provided on the free end of the tie-bolt and is tightened against a stationary abutment in the direction of the stationary fixation of the tie-bolt. The design of a gas turbine system comprising tie-bolts can be found, inter alia, in the textbook "Stationäre Gasturbinen" ("Stationary Gas Turbines") by Ch. Lechner and J. Seume, Springer-Verlag 2003, ISBN 3-540-42831-3.

Since, in the case of classical nuts, the torque required to tighten the nuts increases by a substantial extent as the size of the nuts increases, refined tensioning devices are used instead of the classical nuts in some cases in order to tension components, for which relatively large nuts are required, inter alia, in order to tension tie-bolts in gas turbine systems. These tensioning devices comprise a tension body which is generally cylindrical and has a central axial main threaded bore and a plurality of secondary threaded bores distributed evenly along the circumference of the main threaded bore, and comprises a plurality of tensioning bolts screwed into the secondary threaded bores. In order to load a component, the tension body is screwed onto the free end of the component. In order to apply a load, the tension body is not rotated further, however, but rather the tensioning bolts are tightened against a stationary abutment in the direction of the stationary fixation of the component.

In bolted joints having large diameters, such a tensioning device can absorb the high preloads and distribute them onto the individual tensioning bolts. One embodiment of such a tensioning device is known from DE 699 37 246 T2, for example. The tensioning devices comprising multiple tensioning bolts are also known by the abbreviation MJT (multi-jackbolt tensioner).

It is known, in order to determine the preload introduced into a component by means of tensioning devices comprising multiple tensioning bolts, to determine the preload present at each individual tensioning bolt and to add up the individual values in order to obtain the resultant preload. The preload on each individual tensioning bolt can be determined by means of a differential measurement of the bolt length in a loaded and an unloaded state. For this purpose, an ultrasonic signal is injected—by means of a sensor provided on each bolt head—into the particular bolt, is reflected on the lower end of the bolt, and is captured again by the sensor. The change in length can be determined from the transit-time difference of the ultrasonic signal and the preload can be determined from the change in length.

A disadvantage of the known method for determining the preload is considered to be, in part, that each individual tensioning bolt must be equipped with a separate sensor and, therefore, special equipment must be utilized. This not only requires a relatively great amount of effort, it is also relatively expensive. In addition, the accuracy of this approach, in which a plurality of individual measurements is carried out and the individual values are subsequently added up, is not always satisfactory.

JP S57161526 A describes a measuring device for determining a tension in a bolt, in the case of which a magnetic field sensor is utilized. For this purpose, the magnetic field sensor is mounted on the side of a bolt head of a bolt. A change in the magnetic field can be determined depending on the tension in the bolt. The tension in the bolt can therefore be determined on the basis of the measured values that are determined.

Even though the previous method provides a simple way for determining a tension in a bolt, several disturbance variables—in particular in the case of complex geometries, which is generally the case with a rotor of a gas turbine—can have an incalculable influence on the measured result, however.

U.S. Pat. No. 4,246,780 A describes yet another measuring method for determining the tension in a shaft, wherein a ring comprising strain gauges is mounted on the shaft. In the case of a drive shaft of a propeller, the torsion results in an increase in the circumference of the shaft, which can be determined by way of the strain gauges. The torsional stress in the shaft can therefore be inferred.

The aforementioned measurement arrangement is problematic for the intended application, however, in that the measurement must take place directly within the area under tension. This area is not accessible in the case of a tie-rod of a rotor of a gas turbine, however. Moreover, the aforementioned method only yields a reliable determination of the torsion.

SUMMARY OF INVENTION

Proceeding from the aforementioned prior art, one problem addressed by the present invention is that of refining a method of the type mentioned at the outset in such a way that it allows for a particularly simple, cost-effective, and robust determination of an axial force introduced into a component. In this case, the method should also make it possible, in particular, to determine relatively great forces which are in the magnitude, for example, of several meganewtons.

In order to solve this problem, the present invention provides a method of the type mentioned at the outset, which is characterized in that—a deformation of the tension body transversely to the axial direction of the tension body is detected, and—the axial tensile force applied into the component is determined from the deformation of the tension body.

It has been shown that, in the case of tensioning devices including a tension body, into which multiple tensioning bolts are screwed, a deformation of the tension body transversely to the axial direction occurs as a result of an action of force in the axial direction. When subjected to an axial load, the tension body undergoes, inter alia, an outwardly directed deformation by twisting, which is representative of the total force on the tension body. According to the invention, this deformation of the tension body in the transverse direction is detected and, on the basis of the deformation, the axial tensile force introduced into the component is determined.

The consideration of the deformation in the transverse direction according to the invention offers the advantages that the considered measurement variable changes relatively greatly on each tensioning bolt, as compared to the individual measurements known from the prior art, and a high relatively measuring accuracy can be achieved. The outer diameter of the tension body can expand, relatively, by up to a few $\frac{1}{10}$%, for example, and this change can be easily measured.

The elastic behavior of the tension body and its geometric dimensions are not subject to notable ageing, and so the method according to the invention is also ideally suited for yielding reliable values for an axial tensile force introduced into a component for relatively longer periods of time, in particular for several years.

By using the method according to the invention, a moderate deformation of the tension body can be detected, which is representative of the total axial force and specifically also in the case in which the deformation of the tension body is not uniform along the circumference of the tension body due to a different loading of the tensioning bolts.

In order to carry out the method according to the invention, it is furthermore not necessary that the component be freely accessible along its axial extension, since it is only the tension body of the tensioning device that must be accessible in order to determine the tensile force. If the method according to the invention is utilized for determining the tensile force of the tie-bolt of a gas turbine system, it is not necessary, in particular, to remove the rotor.

At the same time, the method according to the invention can be carried out relatively simply and does not generate substantial costs. In contrast to the prior art, it is not necessary for each tensioning bolt of the tensioning device to have special equipment.

The deformation of the tension body of the tensioning device in the transverse direction can be measured, for example, using a strain sensor, such as a strain gauge. Other approaches, for example, a simple measurement of the length of the outer circumference of the tension body at a predefined axial position, are also possible.

In order to determine the axial force introduced into the component on the basis of the deformation of the tension body detected according to the invention, a calibration curve recorded under known force conditions can be utilized, which calibration curve assigns a corresponding axial tensile force to values of a deformation, for example values of a change in length of the outer diameter of the tension body or values of a resistance of a strain gauge. It is also possible, in principle, to calculate or simulate the correlation between the deformation of the tension body and the introduced tensile force using mathematical models.

According to one embodiment of the method according to the invention, it is provided that the deformation of the tension body is detected at at least one predefined axial position on the tension body.

In particular, the deformation is detected at an axial position in that axial end region of the tension body that faces the direction of the stationary fixation of the component.

The deformation can be suitably detected transversely to the axial direction in that axial end region of the tension body that faces the stationary fixation of the component. The deformation transversely to the axial direction is the most pronounced in this axial end region of the tension body.

In one advantageous embodiment of the method according to the invention, a deformation of the outer circumference of the tension body is detected. Since a nearly ideally single-axial radial expansion occurs in the area of the outer circumference of the tension body, this area is particularly suitable for consideration for the method according to the invention. If a strain gauge is utilized for detecting the deformation, no cross-sensitivities occur, i.e., no sensitivities transversely to the measuring direction in the circumferential direction of the outer diameter of the tension body, and the measured values are particularly reliable. A deformation of the inner circumference of the tension body can also be detected, in principle, although multi-axial stress states occur in this case.

The deformation of the tension body can be detected, for example, with the aid of a strain sensor, in particular a strain gauge, which is provided on the tension body or is situated on the tension body.

In this case it can be provided, in particular, that the deformation of the tension body is detected by means of a strain gauge which extends along the outer circumference of the tension body, in particular along the entire outer circumference of the tension body. The strain sensor can extend, for example, over an annular surface along the outer circumference of the tension body. It is particularly advantageous when the strain sensor extends along the entire outer circumference of the tension body.

The strain gauge can be situated on the tension body or the strain gauge is provided directly on the tension body. In one advantageous embodiment, a strain gauge is provided on the tension body, in that the strain gauge is sputtered directly onto the tension body. Sputtering offers the advantage that there is no need to utilize adhesive in order to fix the strain gauge on the tension body; adhesive can lose its holding force over relatively long time periods.

A strain gauge utilized within the scope of the method according to the invention can be formed, for example, by a layer of NiCr or Ni-DLC on SiO2 or DLC (diamond-like carbon).

Yet another embodiment of the method according to the invention is characterized in that the deformation of the outer circumference of the tension body is detected, in that a measuring ring, the diameter of which is adjustable, and along the outer circumference of which a strain gauge is provided, is clamped onto the tension body at a predefined axial position, and a value for the deformation of the strain gauge is recorded and is compared, in particular, with a reference value.

In one advantageous embodiment, the strain gauge extends around the entire circumference of the measuring ring. In the case of the measuring ring as well, it can be further provided that the strain gauge is sputtered onto the measuring ring, in order to avoid the disadvantages associated with the use of an adhesive.

As an alternative to the use of a measuring ring comprising a strain gauge, the deformation of the outer circumference of the tension body can also be detected, in that a measuring ring, the diameter of which can be adjusted by means of a micrometer screw gauge, and which has a length scale, is clamped onto the tension body at a predefined axial position, and a length value is read out and is compared, in particular, with a reference value.

The use of a measuring ring, i.e., another component independent of the tension body, for measuring the deformation of the tension body offers the advantage that the tension body requires absolutely no equipment. The method according to the invention can be carried out by means of a measuring ring on any existing tensioning device in a particularly easy way.

The measuring ring is clamped onto the tension body, in particular with a predefined tangential stress, in order to obtain particularly reliable measured values.

In order to be clamped onto the tension body, the measuring ring advantageously comprises a tensioning element, for example a tension spring or a bolt. The measuring ring is advantageously designed as an open ring, the ends of which can be moved toward each other and away from each other by means of the tensioning element, in order to change the diameter of the measuring ring and clamp the measuring ring onto the tension body of the tensioning device.

The measuring ring can be made from Teflon, Kapton film, or Nomex film.

In one refinement of the method according to the invention, it is provided that the deformation of the outer circumference of the tension body is detected, in that—the measuring ring is clamped onto the tension body at an axial reference position in the axial end region of the tension body that faces the direction of the free end of the component, —a length value is read on the scale of the measuring ring at the axial reference position, or a value for the deformation of the strain gauge is recorded at the axial reference position, —the length value read at the axial reference position is stored as a length reference value, or the value for the deformation recorded at the axial reference position is stored as a deformation reference value, —the measuring ring is released and is slid in the direction of the stationary fixation of the component and is clamped onto the tension body at at least one axial measurement position, —a length value is read on the scale of the measuring ring at the at least one axial measurement position, or a value for the deformation of the strain gauge is recorded at the at least one axial measurement position, and—the difference between the length value at the axial reference position and the length value at the at least one axial measurement position is determined, or the difference between the value for the deformation of the strain gauge at the axial reference position and the value for the deformation of the strain gauge at the at least one axial measurement position is determined.

According to this embodiment, the deformation of the tension body can be detected, for example, in that the measuring ring is clamped onto the tension body once in the end region of the tension body facing way from the stationary fixation of the component, and this axial position is considered to be the reference position. The deformation of the strain gauge at this point or the length value read on the measuring ring at this axial position is then selected as the reference value, in particular as the zero value, since the deformation of the tension body is lowest or is zero at this point. In this case, an axial position is advantageously selected that lies as close as possible to the end face of the tension body facing the free end of the component, in order to utilize the position having the least amount of deformation as the reference.

Subsequently, the measuring ring is released, is slid axially in the direction of the stationary fixation of the component and, at another axial position that lies closer to the stationary fixation of the component, is clamped on the tension body again, and the deformation of the strain gauge is detected or a length value is measured at this axial measurement position. In this case, the deformation or a length value can be detected or measured at only one axial measurement position, or this takes place at multiple axial measurement positions, wherein a comparison of the values recorded at the measurement positions is carried out with the reference value, for example, in each case, or the values recorded at adjacent measurement points are compared with each other.

A resistance value of the strain gauge is detected, in a manner known per se, as the value for the deformation of the strain gauge.

In one refinement of the method according to the invention, it is provided that the measuring ring is screwed onto the tension body at at least one axial measurement position that lies in that axial end region of the tension body that faces the direction of the stationary fixation of the component.

In particular for the case in which only one reference value is recorded at the axial reference position and one measured value is recorded at an axial measurement position, the one axial measurement position advantageously lies as close as possible to the end of the tension body facing the stationary fixation of the component where the deformation transversely to the axial direction has the greatest deflection. If values are recorded at multiple axial measurement positions, in one advantageous embodiment, at least one axial measurement position lies as close as possible to this end.

A suitable axial position close to the end of the tension body facing the stationary fixation is, for example, remote from this end of the tension body by one millimeter or a few millimeters in the axial direction.

The invention also provides that a tensioning device is utilized, which comprises a tension body having a basic cylindrical shape, along the cylindrical axis of which the main threaded bore extends. This shape has proven effective for the tension body.

Yet another embodiment is characterized in that a tensioning device is utilized, which comprises a tension body, through which the secondary threaded bores extend axially or essentially axially.

Finally, it can be provided that the axial force introduced into a tie-bolt of a gas turbine is determined and the mechanical stress of the tie-bolt in the axial direction is calculated, in particular on the basis of the axial force introduced into the tie-bolt. The method according to the invention can be carried out, for example, in order to determine the axial tensile force in the tie-bolt of a gas turbine. This can be, in particular, a central tie-bolt in a gas turbine system.

In principle, the method according to the invention can be utilized for any types of components, into which an axial tensile force is introduced by means of a tensioning device comprising a tension body and multiple tensioning bolts. Since the tensioning devices comprising a tension body and multiple tensioning bolts can replace conventional nuts, the application is conceivable for all applications, in which an axial tensile force is also introduced into a component by means of conventional nuts. For example, the axial force introduced into a bolt—which, together with a tensioning device comprising a tension body and multiple tensioning bolts, compresses a flange—can be determined according to the invention.

BRIEF DESCRIPTION OF THE DRAWINGS

Further features and advantages of the present invention will become clear on the basis of the following description of one embodiment of the method according to the invention, with reference to the attached drawing. Therein

DETAILED DESCRIPTION OF INVENTION

Figure 1:
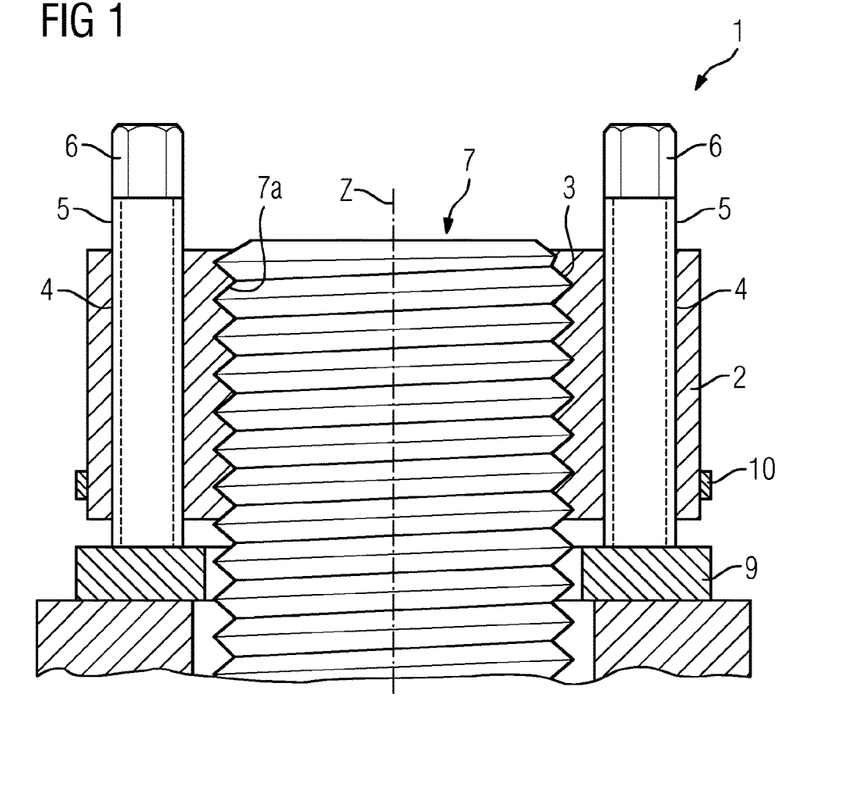
FIG. 1 shows a schematic sectional representation of a tensioning device comprising a tension body and a plurality of tensioning bolts in the unloaded state.

FIG. 1 shows a tensioning device 1 comprising a cylindrical tension body 2, in which a central axial main threaded bore 3 and plurality of secondary threaded bores 4 distributed evenly along the circumference of the main threaded bore 3 are provided. The main threaded bore 3 extends through the cylindrical tension body 2 along the cylinder axis Z of said body. The diameter of the main threaded bore 3 is substantially greater than that of the secondary threaded bore 4. Specifically, the diameter is more than four times as great as the diameter of the secondary threaded bores 4.

Figure 2:
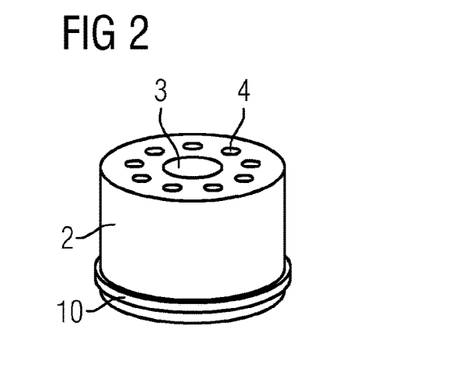
FIG. 2 shows a schematic representation of an outer view of the tension body of the tensioning device represented in FIG. 1.
Figure 3:
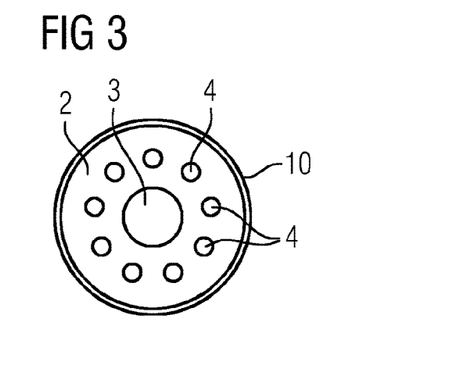
FIG. 3 shows a top view of the tension body from FIG. 2.

In the exemplary embodiment represented, a total of nine axial secondary threaded bores 4, which are evenly situated around the central main threaded bore 3, are provided in the tension body 2, as is clear from the representations in FIGS. 2 and 3, which show an outer view of the tension body 2 of the tensioning device 1 represented in FIG. 1.

A tensioning bolt 5 has been screwed into each secondary threaded bore 4 and protrudes from the tension body 2 on both sides in the axial direction in each case. A bolt head 6 is provided on the end of each of the tensioning bolts 5 that points upward in FIG. 1; by way of said bolt head, a suitable tool, which is not represented in the figures, for screwing and unscrewing the tensioning bolts 5 can be accommodated in a manner known per se.

The tension body 2 of the tensioning device 1 has been screwed onto the male thread 7a provided on the free end of a central tie-bolt 7—which is only partially represented in FIG. 1—of a gas turbine system which is not apparent in the figures. The central tie-bolt 7 and the tension body 2 screwed onto said tie-bolt are apparent in the schematic representation in FIG. 4.

Figure 4:
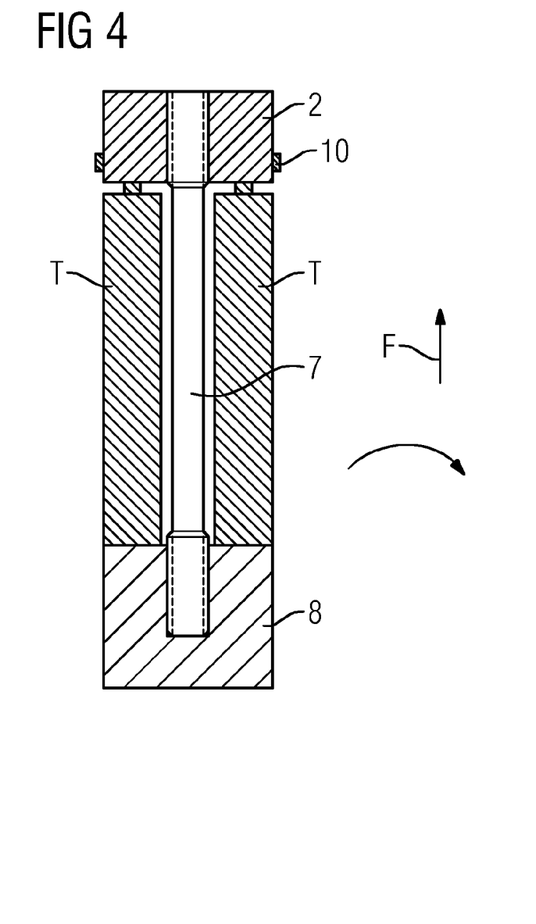
FIG. 4 shows a schematic sectional representation of the central tie-bolt of a gas turbine system, which has been loaded in the axial direction by means of the tensioning device represented in FIG. 1.

The central tie-bolt 7 is fixed in position at its end pointing downward in FIG. 4, in that the tie-bolt has been screwed into the front hollow shaft 8 of the gas turbine system. A plurality of rotor disks, which are not represented in FIG. 4, has been slid onto the tie-bolt 7 in a manner known per se. FIG. 4 shows, merely schematically, the rotor drum T which includes all rotor disks and the rear hollow shaft. The rotor disks are held parallel to each other by means of the tie-bolt 7 and are pressed against each other by means of the tensioning device 1. For this purpose, the tensioning bolts 5 of the tensioning device 1 are tightened in the direction of the stationary fixation of the tie-bolt 7 in the hollow shaft 8 against a pressure disk 9 which is made from particularly hard material, is apparent only in FIG. 1, lies between the tension body 2 and the rotor disks, and functions as a stationary abutment. As a result of the tensioning bolts 5 being screwed into the secondary threaded bores 4 in the tension body 2, the distance between the pressure disk 9, which is functioning as a stationary abutment, and the tension body 2 screwed onto the tie-bolt 7 is increased and, as a result thereof, an axial tensile force is introduced into the tie-bolt 7.

This axial tensile force introduced into the central tie-bolt 7 should correspond to a defined value, in order to ensure a safe operation of the gas turbine system. The axial force introduced into the tie-bolt 7 can be adjusted to a predetermined value before the initial startup of the system. It can be desirable to monitor the tie-bolt tension over the course of the service life of the gas turbine system. One embodiment of the method according to the invention is carried out in order to determine the axial force introduced into the tie-bolt 7.

According to the invention, a deformation of the tension body 2 of the tensioning device 1 transversely to the axial direction is detected and the axial tensile force introduced into the tie-bolt 7 is determined on the basis of the deformation of the tension body 2 in the transverse direction.

In the loaded state, the tension body 2 is subject to a deformation transversely to the axial direction, specifically a deformation by twisting, due to the axial force acting thereon. This deformation transversely to the axial direction, i.e., transversely to the cylinder axis Z, can be seen in FIG. 5 which shows a sectional representation of the tension body 2 from FIG. 4 in a simplified representation without secondary threaded bores 4 and without tensioning bolts 5. The transverse deformation is represented in a particularly pronounced manner in FIG. 5 for the sake of illustration. The fact that the force in the axial direction causes a deformation of the tension body 2 transversely thereto is indicated purely schematically in FIG. 4 with the aid of corresponding arrows.

In the embodiment represented, a strain gauge 10 is provided on the tension body 2 for the purpose of measuring the deformation of the tension body 2 transversely to the cylinder axis Z. Specifically, the strain gauge 10—as apparent in FIGS. 2 and 3—extends over an annular surface along the entire outer circumference of the tension body 2 and, in fact, in that axial end region of the tension body that faces the stationary fixation of the tie-bolt 7 in the hollow shaft 8. The strain gauge 10 has been sputtered onto the tension body 2.

Figure 5:
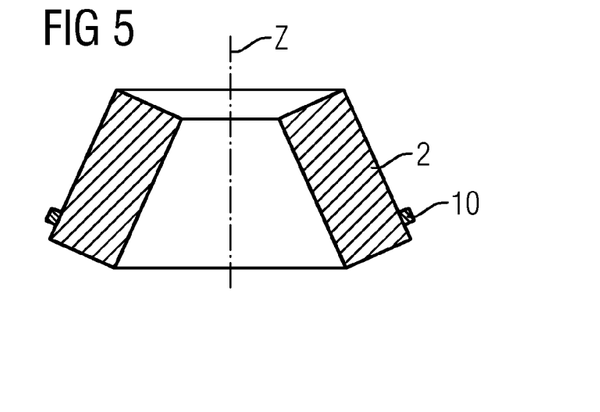
FIG. 5 shows a sectional representation of the loaded tension body represented in FIG. 4.

Due to the deformation of the tension body 2 in the state represented in FIG. 5, the strain gauge 10 has a different resistance—in a manner known per se—than it does in an unloaded state, in which the tension body 2 has not been twisted up. This change in resistance is a measure of the deformation of the tension body 2. By using a calibration curve which was previously recorded for known axial force values, a value for the axial force can be assigned to the measured deformation, i.e., the recorded resistance value of the strain gauge 10 in the exemplary embodiment represented. The recording of the resistance value and the determination of the axial force take place in a manner known per se in a measuring and evaluation unit—which is not represented in the figures—connected to the strain gauge.

The determination of the axial force, according to the invention, by measuring the deformation of the tension body 2 by means of a strain gauge 10 can be carried out at any point in time. The tension body 2 is easily accessible. It is not necessary to remove the rotor of the gas turbine in order to carry out the method according to the invention.

The elastic behavior and the geometric dimensions of the tension body 2 undergo practically no notable ageing, and so reliable measured values can be obtained by means of the strain gauge 10 for many years, in particular throughout the entire service life of the gas turbine system. Since the strain gauge 10 has been sputtered onto the tension body 2, the strain gauge also lasts particularly reliably for a relatively long period of time and the disadvantages associated with adhesives, in particular an unwanted detachment of the strain gauge 10 from the tension body 2, are avoided.

The deformation of the tension body 2 is nearly ideally radial along the outer circumference of the tension body 2, in particular. Hardly any influences by a cross-sensitivity of the strain gauge 10 arise, i.e., a sensitivity transversely to the intended measuring direction in the circumferential direction of the outer circumference of the tension body 2, and so particularly reliable measured values are obtained.

The method according to the invention is carried out with less effort and, therefore, at lower cost, as compared to the known methods.

Figure 6:
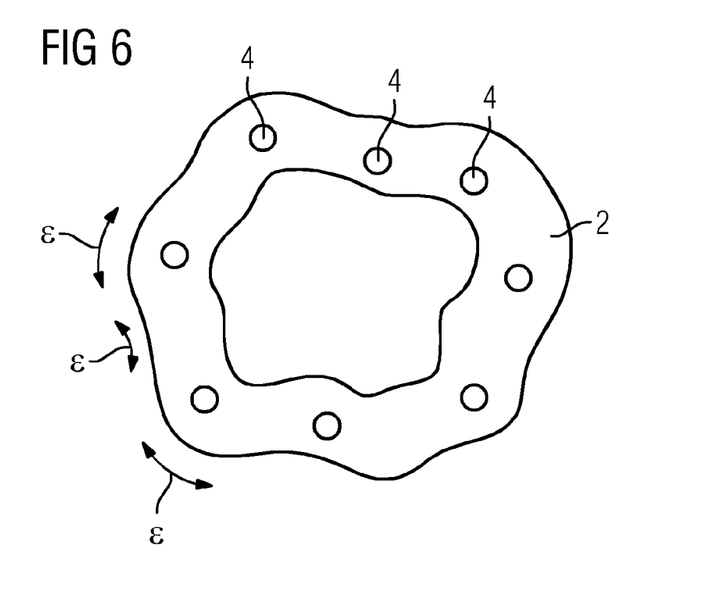
FIG. 6 shows a schematic representation of a view of the tension body represented in FIG. 4, in the loaded state for a case of a highly non-uniform introduction of force by way of the tensioning bolts.

Yet another advantage of the method according to the invention is that, by means of only one strain gauge 10, a moderate deformation of the tension body 2 can be detected, which is representative of the total force and, in fact, even when the deformation of the tension body 2 along its outer circumference is not uniform due to a different loading of the tensioning bolts 5, as represented in FIG. 6. The non-uniform deformation of the tension body is represented in an exaggerated manner in FIG. 6 for the purpose of illustration.

As an alternative to the above-described exemplary embodiment, in which a tensioning device 1 comprising a tension body 2 is utilized, on which a strain gauge 10 has been directly sputtered, the method according to the invention can also be carried out using a measuring device separate from the tension body 2, specifically a measuring ring 11.

Figure 7:
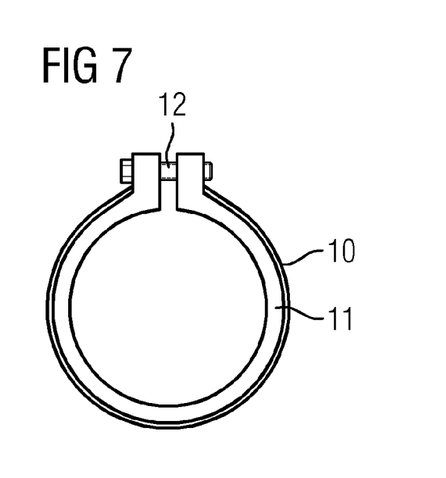
FIG. 7 shows a schematic representation of one embodiment of a measuring ring comprising a bolt and along the outer circumference of which a strain gauge has been provided.
Figure 8:
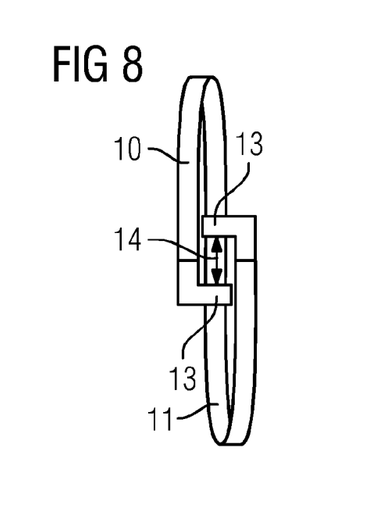
FIG. 8 shows a schematic representation of yet another embodiment of a measuring ring comprising a tension spring and along the outer circumference of which a strain gauge has been provided.
Figure 9:
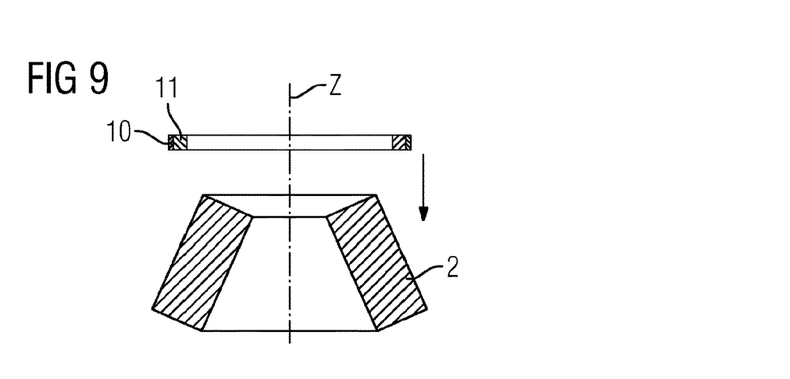
FIGS. 9-12 show the method steps of one embodiment of the method according to the invention for determining an axial tensile force introduced into a component.

FIGS. 7 and 8 each show a schematic representation of one embodiment of a measuring ring 11 which can be utilized for the method according to the invention. The measuring ring 11 is designed as an open ring, the ends of which can be moved toward each other and away from each other by means of a tensioning element, in order to adjust the diameter of the measuring ring 11. Furthermore, a strain gauge 10 which extends over the entire outer circumference of the particular measuring ring 11 is provided on the outer circumference of both measuring rings 11. Each of the two measuring rings 11 shown is made from Teflon.

The two measuring rings 11 represented in FIGS. 7 and 8 differ only with respect to the tensioning element which is provided for mounting the measuring ring 11 on the outer circumference of the tension body 2 of the tensioning device 1 with the aid of multiple tensioning bolts 5.

While the measuring ring 11 represented in FIG. 7 comprises a bolt 12 for clamping on the tension body 2, which bolt extends through two openings in the end regions of the open measuring ring 11, in the case of the measuring ring 11 represented in FIG. 8, a tensioning spring 14—which is schematically indicated in FIG. 8 only by means of a double arrow—is provided between two projections 13 protruding from the two end regions of the open ring.

The measuring ring 11 is utilized in order to detect, according to the invention, the deformation of the tension body 2 of a tensioning device 1 comprising multiple tensioning bolts 5. The measuring ring 11 enables the detection of the deformation in the transverse direction also in the case of tension bodies 2 that have not been provided with a strain gauge.

The implementation of one embodiment of the method according to the invention with the use of a measuring ring is described in the following with reference to FIGS. 9 to 12.

Figure 10:
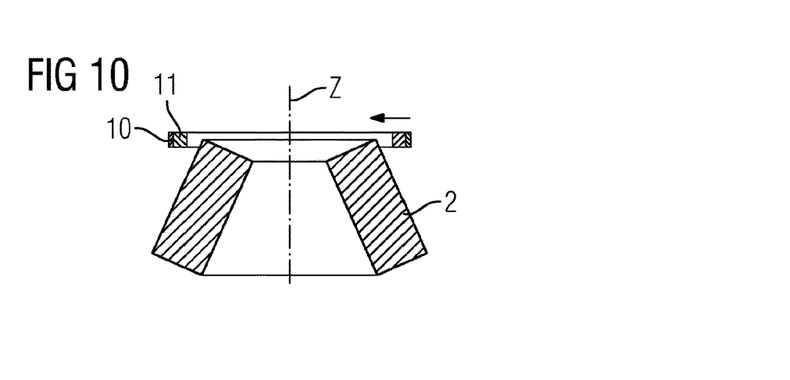
Figure 11:
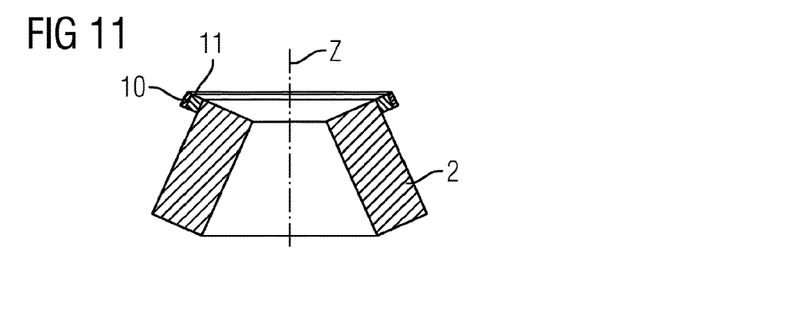

In a first step, the measuring ring 11, which can be alternatively provided with a bolt 12 according to FIG. 7 or with a tension spring 14 according to FIG. 8, is slid onto the tension body 2 from the outside (cf. FIG. 9) and is clamped onto the tension body 2 at an axial reference position in that axial end region of said tension body that points in the direction of the free end of the tie-bolt 7 (cf. FIGS. 10 and 11). The tie-bolt 7 is not represented in FIGS. 9 to 12. As is the case in FIGS. 4 and 5, the free end of the tie-bolt 7, which is not represented in FIGS. 9 to 12, points upward. In the exemplary embodiment represented, the axial reference position lies directly on the upward-pointing end of the tension body 2, as is apparent in FIG. 1.

The procedure for clamping the measuring ring 11 on the tension body 2 is schematically indicated in FIG. 10 with the aid of an arrow.

If a measuring ring 11 according to FIG. 7 is utilized, said measuring ring is clamped onto the tension body 2 from the outside, in that the bolt 12 is simply rotated further, and so the two end regions of the open measuring ring 11 are moved further toward each other, whereby the diameter of the measuring ring 11 is reduced.

Using the measuring ring according to FIG. 8, the tension spring 14 must be compressed in order to increase the diameter of the measuring ring 11 and to be able to position the measuring ring 11 in this position axially on the tension body 2. If the measuring ring 11 is situated at the axial reference position, the tension spring 14 can be released, whereby the two projections 13 are pressed apart and, as a result, the diameter of the measuring ring 11 is reduced and is clamped on the tension body.

The measuring ring 11 is advantageously clamped onto the tension body with a predefined tangential stress in order to obtain particularly reliable measured values.

The deformation of the strain gauge 10 provided on the measuring ring 11, in particular a corresponding resistance value of the strain gauge 10, is detected at the axial reference position in the clamped state of the measuring ring 11. This value is stored as a resistance reference value, in particular as a zero value, since the deformation is lowest or zero at the axial reference position.

The measuring ring 11 is subsequently released and is slid in the direction of the stationary fixation of the tie-bolt 7, i.e., downward in FIGS. 9 to 12, and is clamped onto the tension body 2 at a first axial measuring position. The first axial measuring position $p_1$ is apparent in FIG. 12 on the uppermost contour of the measuring ring 11 represented by way of dashed lines.

At the first axial measurement position $p_1$, a value for the deformation of the strain gauge 10, specifically a resistance value, is recorded and stored once more.

Figure 12:
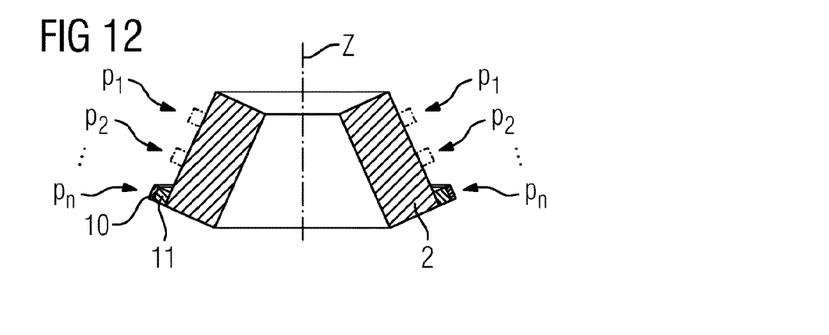

Subsequent thereto, a resistance value is recorded and stored at each of two or more further axial measurement positions which are labeled $p_2$ to $p_n$ in FIG. 12.

The deformation of the tension body 2 can be determined from the (axial) progression of the resistance values and, on the basis thereof, the axial tensile force introduced into the tie-rod 7 can be determined, which is possible, for example, using the aforementioned calibration curves.

As an alternative to recording resistance values at multiple axial positions on the tension body 2, it is also possible to carry out only one single measurement in the end region of the tension body 2 pointing downward in FIGS. 9 to 12, for example, at the position of the measuring ring 11 represented in FIG. 12. If a reference value, in particular a zero value, has already been obtained, the deformation of the tension body 2 can be determined from the comparison of the individual measured values with the reference value and, on the basis thereof, the axial force can be determined.

It is also possible to carry out precisely two measurements, namely a reference measurement at the upper—in FIGS. 9 to 12—end of the tension body 2 and a measurement at the lower—in FIGS. 9 to 12—end of the tension body 2.

The recording of the resistance values of the strain gauge 10 provided on the measuring ring 11 and the determination of the axial force take place in a manner known per se in a measuring and evaluation unit—which is not represented in the figures—connected to the strain gauge 10 on the measuring ring 11.

Using a measuring ring 11, the method according to the invention can be carried out on the tension bodies 2 of all tensioning devices 1 already in operation, without the need to retrofit the tensioning devices 1.

Yet another advantage of a measuring ring 11 is that the axial direction is stress-free, whereby it is ruled out that the strain gauge 10 yields signals that have been corrupted due to cross-sensitivities.

Although the invention was illustrated and described in greater detail by means of the preferred exemplary embodiment, the invention is not restricted by the disclosed examples, and other variations can be derived therefrom by a person skilled in the art, without departing from the scope of protection of the invention.

The invention claimed is:

1. A method for determining an axial tensile force applied into a component, comprising:
    fixing the component in position and applying the axial tensile force into the component from a free end of the component by a tensioning device which includes a tension body having a central axial main threaded bore and a plurality of secondary threaded bores distributed evenly along the circumference of the main threaded bore, and which includes tensioning bolts which are screwed into the secondary threaded bores, where the tension body is screwed onto the free end of the component and the tensioning bolts are tightened against a stationary abutment in the direction of the stationary fixation, and
    determining the axial tensile force applied into the component by,
        detecting deformation of the tension body transversely to the axial direction of the tension body, and
        determining the axial tensile force applied into the component from the deformation of the tension body.

2. The method as claimed in claim 1,
    wherein the deformation of the tension body is detected at at least one predefined axial position on the tension body.

3. The method as claimed in claim 2,
    wherein the deformation is detected at an axial position in that axial end region of the tension body that faces the direction of the stationary fixation of the component.

4. The method as claimed in claim 1, further comprising:
    detecting a deformation of the outer circumference of the tension body.

5. The method as claimed in claim 1,
    wherein the deformation of the tension body is detected by a strain sensor, or a strain gauge, which is provided on the tension body or is situated on the tension body.

6. The method as claimed in claim 4,
    wherein the deformation of the tension body is detected by a strain gauge which extends along the outer circumference of the tension body.

7. The method as claimed in claim 4,
wherein the deformation of the outer circumference of the tension body is detected, in that a measuring ring, the diameter of which is adjustable, and along the outer circumference of which a strain gauge is provided, is clamped onto the tension body at a predefined axial position, and a value for the deformation of the strain gauge is recorded and is compared with a reference value.

8. The method as claimed in claim 7, further comprising:
using a measuring ring, onto which the strain gauge has been sputtered.

9. The method as claimed in claim 4,
wherein the deformation of the outer circumference of the tension body is detected, in that a measuring ring, the diameter of which can be adjusted by a micrometer screw gauge, and which has a length scale, is clamped onto the tension body at a predefined axial position, and a length value is read out and is compared with a reference value.

10. The method as claimed in claim 7,
wherein the deformation of the outer circumference of the tension body is detected, by
clamping the measuring ring onto the tension body at an axial reference position in the axial end region of the tension body that faces the direction of the free end of the component,
reading a length value on the scale of the measuring ring at the axial reference position, or recording a value for the deformation of the strain gauge at the axial reference position,
storing the length value read at the axial reference position as a length reference value, or storing the value for the deformation recorded at the axial reference position as a deformation reference value,
releasing the measuring ring and sliding in the direction of the stationary fixation of the component and clamping onto the tension body at at least one axial measurement position,
reading a length value on the scale of the measuring ring at the at least one axial measurement position, or recording a value for the deformation of the strain gauge at the at least one axial measurement position, and
determining the difference between the length value at the axial reference position and the length value at the at least one axial measurement position, or determining the difference between the value for the deformation of the strain gauge at the axial reference position and the value for the deformation of the strain gauge at the at least one axial measurement position.

11. The method as claimed in claim 10, further comprising:
screwing the measuring ring onto the tension body at at least one axial measurement position that lies in that axial end region of the tension body that faces the direction of the stationary fixation of the component.

12. The method as claimed in claim 1, further comprising:
utilizing a tensioning device, which comprises a tension body having a basic cylindrical shape, along the cylindrical axis of which the main threaded bore extends.

13. The method as claimed in claim 1, further comprising:
utilizing a tensioning device, which comprises a tension body, through which the secondary threaded bores extend axially or essentially axially.

14. The method as claimed in claim 6,
wherein the deformation of the tension body is detected by means of a strain gauge which extends along the entire outer circumference of the tension body.

* * * * *